March 25, 1969     A. K. CHITAYAT     3,434,787

DOUBLE AXES INTERFEROMETER

Filed Nov. 15, 1965

INVENTOR.
ANWAR K. CHITAYAT
BY *James P. Malone*

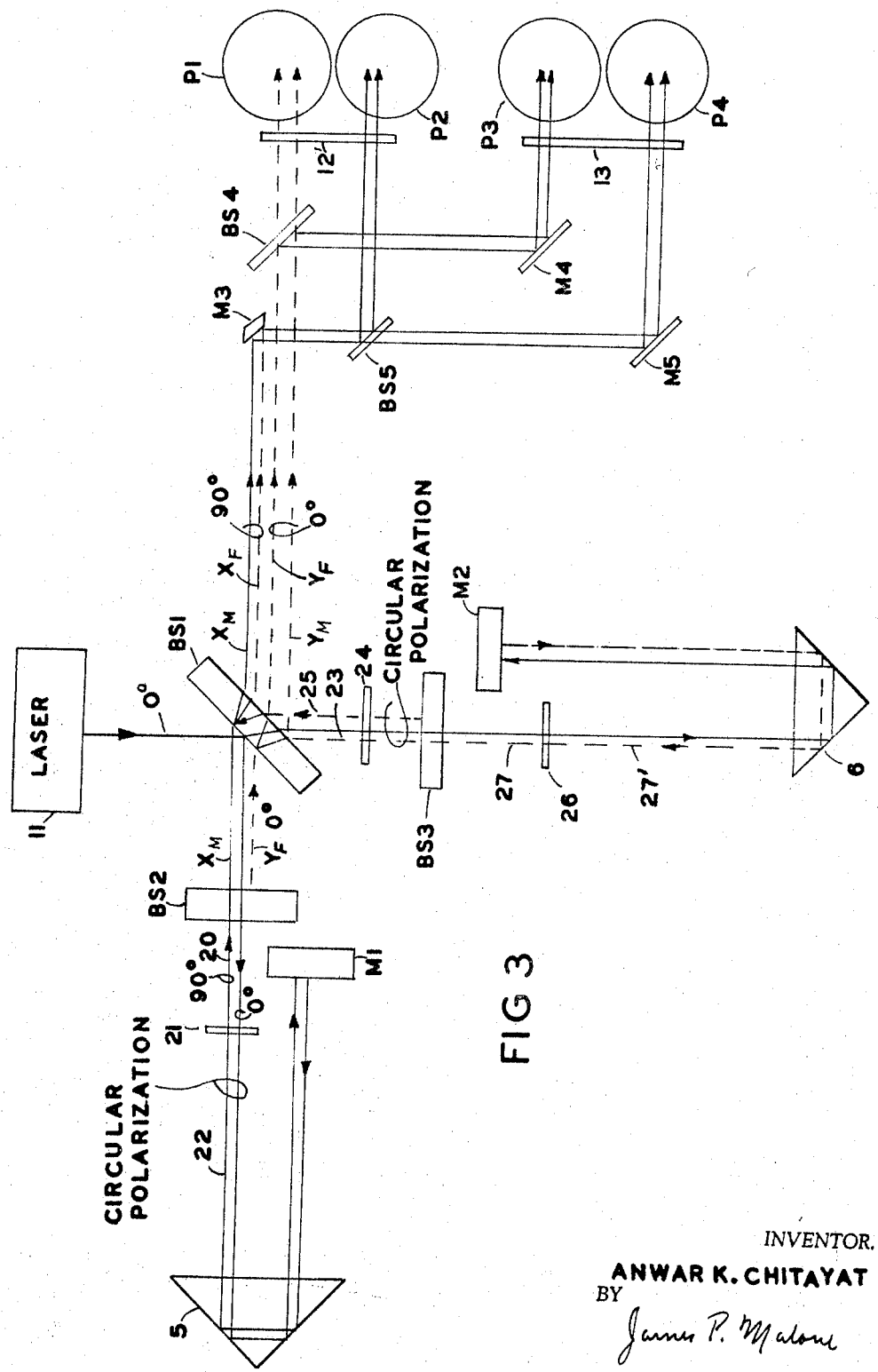

United States Patent Office 3,434,787
Patented Mar. 25, 1969

3,434,787
DOUBLE AXES INTERFEROMETER
Anwar K. Chitayat, Plainview, N.Y., assignor to OPTOmechanisms, Inc., Plainview, N.Y.
Filed Nov. 15, 1965, Ser. No. 507,919
Int. Cl. G01b 9/02
U.S. Cl. 356—106     4 Claims

ABSTRACT OF THE DISCLOSURE

An improved double axes interferometer means comprising a base member, a source of radiant energy connected to said base member having a first polarization, a first beam splitter in the path of said beam at an angle of approximately 45° to said path, said first beam splitter being adapted to provide two beams on first and second axes at approximately 90° to each other, means to polarize one of said beams in a second polarization, a first reflector movably mounted on the first axis of said axes, a second reflector movably mounted on the second axis of said axes, first and second reference beam means, one for each of said axes, first fringe measuring means responsive to said first polarization and second fringe measuring means responsive to said second polarization.

---

This invention relates to a double axes interferometer and more particularly to such means using one beam source.

Interferometers are used for making accurate measurements of movements of optical systems or mechanical components. The present invention provides interferometer measuring means for a device wherein it is desired to measure along two axes for instance X and Y axes which are displaced 90° using a single beam source. Typical uses of such devices are film viewers, machine tool devices or other work layout means.

The present invention describes a unique and simple scheme for a two axes interferometer using one laser. The approach utilizes the principle of polarization, where the X axis beams are polarized in a single plane, while the Y axis is polarized in a plane perpendicular to the X axis so that by inserting polarizing filters at X and Y axes photomultipliers the two axes are completely independent of each other. Direction sensing means are provided.

Accordingly, a principal object of the invention is to provide new and improved interferometer means.

Another objection of the invention is to provide new and improved laser interferometer means.

Another object of the invention is to provide new and improved double axes interferometer means.

Another object of the invention is to provide new and improved double axes interferometer means using a single beam source.

Another object of the invention is to provide new and improved double axes interferometer means for mechanical devices such as machine tools, or work layout machines having X and Y axes displaced 90° to each other.

Another object of the invention is to provide new and improved double axes interferometer means having directional sensing means.

Another object of the invention is to provide new and improved double axes interferometer means comprising a base member, a source of radiant energy connected to said base member having a first polarization, a first beam splitter in the path of said beam at an angle of approximately 45° to said path, said first beam splitter being adapted to provide two beams on first and second axes at approximately 90° to each other, means to polarize one of said beams in a second polarization, a first reflector movably mounted on the first axis of said axes, a second reflector movably mounted on the second axis of said axes, first and second reference beam means, one for each of said axes, first fringe measuring means responsive to said first polarization and second fringe measuring means responsive to said second polarization.

These and other objects of the invention will be apparent from the following specification and drawings of which:

FIGURE 3 is a schematic diagram of a modification illustrating the use of the invention.

Figure 1:
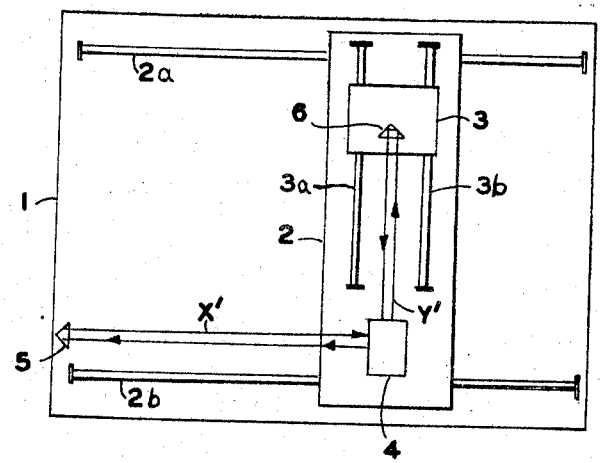
FIGURES 1 and 1A are diagrams illustrating the use of the invention.

Referring to FIGURE 1, the invention may be used on a device having a movement along two axes. For instance, the device may be mechanical work layout machines or machine tool devices comprising a base 1, a first carriage 2 adapted to move on ways 2a and 2b along the X axis and having a second carriage 3 adapted to move along the Y axis, the second carriage being movably mounted on the ways 3a and 3b, on the first carriage 2.

In order to accurately make the measurements along the axes, the present interferometer 4 is mounted on the X axis carriage 2. The interferometer 4 transmits beams X' and Y' along the respective axes, these beams being reflected by a reflector 5 mounted on the base and by a reflector 6 mounted on the Y axis carriage. Reflectors 5 and 6 may be conventional corner cubes. Therefore, carriages 2 and 3 are positioned so that the utilization means are positioned as desired and the measurements are made by the interferometer along the X and Y axes.

Figure 1A:
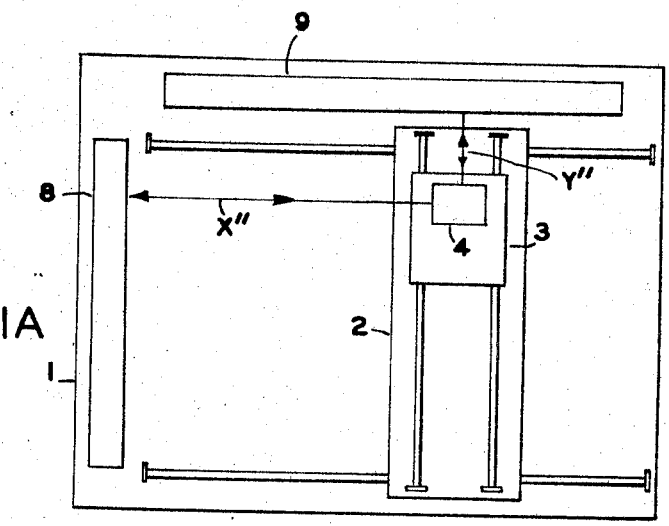

FIGURE 1A utilizes another method of mounting the interferometer 4 on the Y axis carriage. In this embodiment the beams X" and Y" are reflected by large mirrors 8 and 9 which are fixedly mounted on the base 1. The same interferometer may be used in either mode of operation without any internal changes in the interferometer 4.

Figure 2:
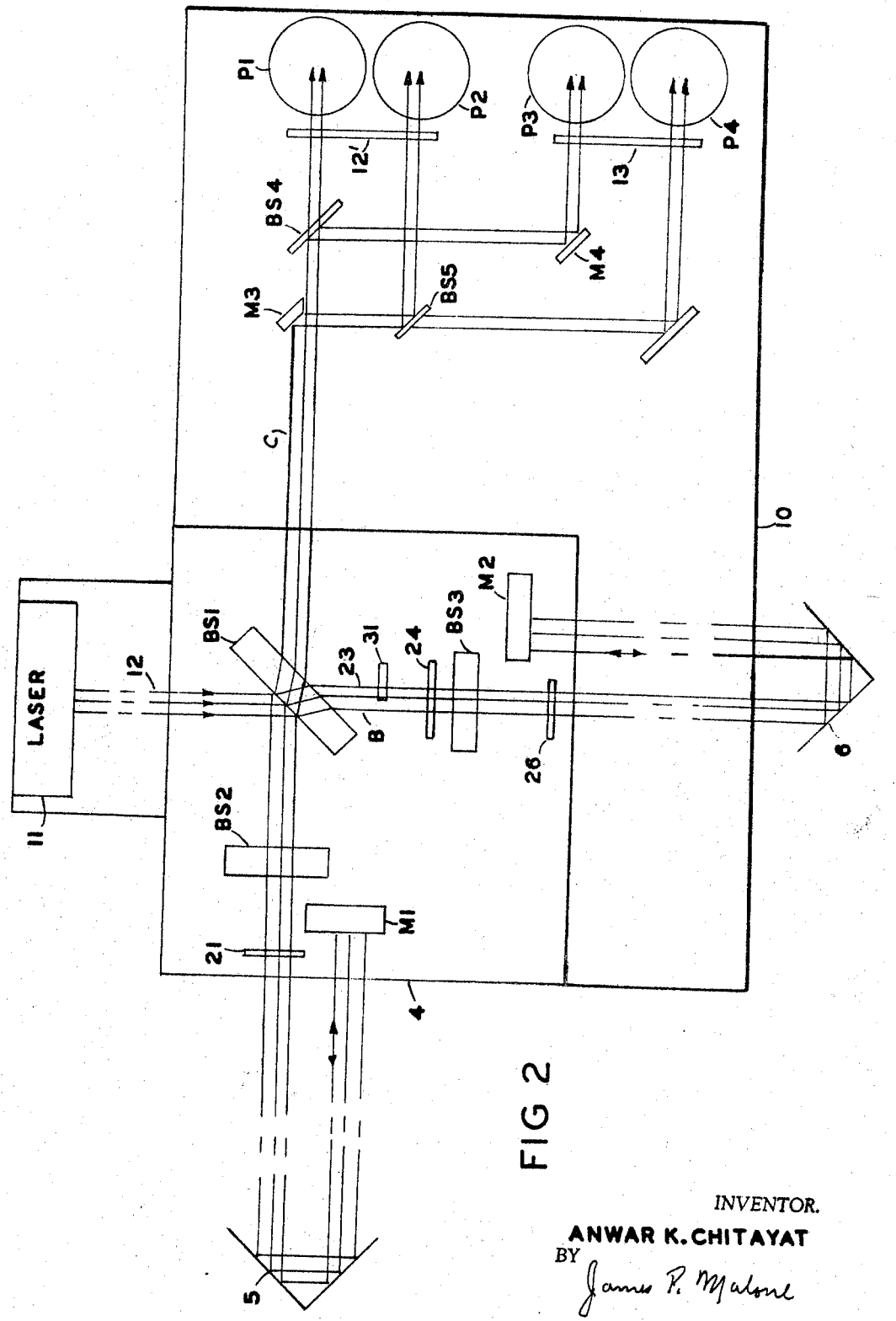
FIGURE 2 is a schematic diagram of the embodiment of the invention.

FIGURE 2 illustrates the general concept of a double beam interferometer for X and Y axes. FIGURE 3 illustrates the general phase relationship of each beam.

Referring to FIGURES 2 and 3, the interferometer of the present invention comprises a base 10 upon which is mounted a conventional laser beam source 11. The laser beam 12 is applied to a first beam splitter BS–1 and a portion of the beam is reflected to beam splitter BS–2. A portion of the beam passes through to X axis corner cube 5 and reflects back to the mirror M1 and then back again to the corner cube 5 and back to the beam splitter BS–2 as will be explained in further detail.

Another portion of the beam B passes through a third beam splitter BS–3 and then to Y axis corner cube 6 and back to the mirror M2 and then back again to the Y axis corner cube 6 and back to the beam splitter BS–3 to beam splitter BS–1 to form fringes.

The fringes are then reflected by means of the beams C over to photomultipliers P1, P2, P3, and P4 as will be further explained. Polarizing plates 12 and 13 are inserted in front of the photomultipliers in order to separate the polarization as will be discussed in detail. All of the beam splitters and mirrors are fixedly mounted to the base 10 by cementing or other permanent mounting means.

More specifically, the beam 12 of the laser is already polarized at an angle arbitrarily selected at 0°. The interferometer beam splitter BS–1 splits the beam into two parts, approximately equal in brightness.

The reflected beam is directed to beam splitter BS–2 which acts as the fixed mirror for the Y axis. The reflected portion $Y_F$, the dotted line, is at 0° polarization.

The transmitted beam 20 through BS–2 is directed to a $L/4$ birefringent plate 21 where L is the wave length of the light. This plate has its axis oriented at 45° and contains two indices of refraction, $n_o$ and $n_e$, dependent on the vibration plane. There is a phase retardation $L/4$ of the beam vibration in line with the plate relative to that at 90° to the plate. The main effect of the plate is to circularly polarize the light beam 22. This beam 22 is reflected by the X axis corner cube 5 reflected by M1 and back into the $L/4$ plate. The circular polarized illumination is now changed back to plane polarized light at 90°. This beam constitutes $X_M$, the X axis movable beam.

The beam 23 passed through BS–1 is first circularly polarized with a $L/4$ retardation birefringent plate 24. It is then partly reflected and partly transmitted through beam splitter BS–3. The reflected portion 25 is passed back through the same $L/4$ plate 24 resulting in a 90° polarized light beam which constitutes the fixed beam of X: ($X_F$).

The beam 27 passing through BS–3 is also passed through a $L/4$ plate 26 which results in a plane polarized light 27′ at 90°. This beam 27′ is reflected by the moving Y axis corner cube 6 onto mirror M2 back onto the Y axis corner cube 6 which circularly polarizes the light. This is further passed through BS–3 and another $L/4$ plate 24 to result in a beam polarized at 180°. This phase is the same plane as 0° and is then considered in the plane of polarization of the laser.

The output beams from the interferometer are:

$X_F$—Fixed beam of X axis at 90° polarization.
$X_M$—Moving beam of X axis at 90° polarization.
$Y_F$—Fixed beam of Y axis at 0° polarization.
$Y_M$—Moving beam of Y axis at 0° polarization.
$X_F$ interferes with $X_M$ resulting in X fringes.
$Y_F$ interferes with $Y_M$ resulting in Y fringes.

Now, one may observe these fringes through a polarizer. If the polarizer is oriented to pass 0° then only Y axis fringes are observed. If now we rotate the polarizer by 90°, then the X axis fringes are observed.

FIGURE 2 shows the splitting of the beams to result in direction sensing. The beam between BS–1 and BS–3 is split into two parts, where one section is retarded by a $L/4$ retardation plate 31. This is not to be confused with a birefringement retardation since it is the same for all directions of polarization. Plate 31 in effect creates two vector components of each polarization displaced 90°. The direction of rotation of the vector indicates the direction of movement of the X and Y axes corner cubes 5 and 6.

Mirror M3 reflects via BS–5 and M5 the illumination passing through the retardation plate via BS–5 and M5 onto photomultipliers P2 and P4. The polarizer 12′ at 0° in front of photomultiplier P2 allows only the Y axis fringes to be observed. On the other hand, photomultiplier P4 observes only the X illumination through 90° polarizer 13. The beams passed at the side of M3 are subdivided in the same manner by BS–4 and M4 to photomultipliers P1 and P3.

Many modifications may be made by those who desire to practice the invention without departing from the scope thereof which is defined by the following claims:

I claim:
1. Double axes interferometer means comprising,
a base member,
a source of radiant energy connected to said base member having a first polarization,
a first beam splitter mounted on said base member in the path of said beam at an angle of approximately 45° to said path,
said first beam splitter providing two beams on first and second axes at approximately 90° to each other,
means to polarize one of said beams in a second polarization,
a first reflector in movable relation to said base member on the first axis of said axes,
a second reflector in movable relation to said base member on the second axis of said axes,
first and second reference beam generating means mounted on said base member, one for each of said axes,
first fringe measuring means mounted to receive and to be responsive to said first polarization beam, and
second fringe measuring means mounted to receive and to be responsive to said second polarization beam.
2. Apparatus as in claim 1 wherein said radiant energy source is a laser.
3. Apparatus as in claim 1 wherein said base member is mounted on a carriage movable along two coordinate axes and said reflectors are stationary.
4. Apparatus as in claim 1 wherein said base member is mounted on a first carriage movable along a first of two coordinate axes and said first reflector is mounted on a second carriage movable on said first carriage along the second of said two coordinate axes, and said second reflector is permanently mounted on said base member along said first axis.

References Cited

UNITED STATES PATENTS 2,604,004  7/1952  Root.
3,225,644  12/1965  Schuch.

FOREIGN PATENTS 129,870  8/1959  Russia.

JEWELL H. PEDERSEN, *Primary Examiner.*

T. MAJOR, *Assistant Examiner.*